US012628745B1

(12) United States Patent

Magableh et al.

(10) Patent No.: US 12,628,745 B1

(45) Date of Patent: May 19, 2026

(54) DEVICE FOR FROST PREVENTION OF CROPS

(71) Applicant: Yarmouk University, Irbid (JO)

(72) Inventors: Ghazi Mustafa Ali Magableh, Irbid (JO); Saba Moh'd Ali Ali Abu-Dalu, Irbid (JO); Mahmoud Zeidan Khalil Mistarihi, Irbid (JO)

(73) Assignee: Yarmouk University, Irbid (JO)

( * ) Notice: Subject to any disclaimer, the term of this patent is extended or adjusted under 35 U.S.C. 154(b) by 0 days.

(21) Appl. No.: 19/055,861

(22) Filed: Feb. 18, 2025

(51) Int. Cl.
A01G 13/06 (2006.01)
F23D 17/00 (2006.01)

(52) U.S. Cl.
CPC ............ A01G 13/06 (2013.01); F23D 17/007 (2013.01)

(58) Field of Classification Search
CPC ......... A01G 13/06; A01G 13/065; F24C 1/02; F24C 1/04
See application file for complete search history.

(56) References Cited

U.S. PATENT DOCUMENTS

| 26,048 | A | * | 11/1859 | Osbrey | F17C 1/12 |
| | | | | | 126/44 |
| 1,032,816 | A | * | 7/1912 | Coulston | F24C 1/02 |
| | | | | | 126/214 R |
| 1,127,652 | A | * | 2/1915 | Lindemann | F24C 1/02 |
| | | | | | 126/36 |

| 1,235,015 | A | * | 7/1917 | Davenport | F24C 1/02 |
| | | | | | 126/36 |
| 1,253,707 | A | * | 1/1918 | Mott, Jr. | F24C 1/02 |
| | | | | | 126/36 |
| 1,335,216 | A | * | 3/1920 | Blackburn | F24C 1/02 |
| | | | | | 126/39 A |
| 1,352,539 | A | * | 9/1920 | Sattler | F24C 1/02 |
| | | | | | 126/36 |
| 1,440,431 | A | * | 1/1923 | Ahrens | F24C 1/02 |
| | | | | | 126/36 |
| 1,468,540 | A | * | 9/1923 | Miller | A01G 13/06 |
| | | | | | 126/59.5 |
| 2,633,455 | A | * | 3/1953 | Finkelstein | A01G 13/06 |
| | | | | | 47/2 |
| 2,994,520 | A | * | 8/1961 | Sherman | A01G 13/06 |
| | | | | | 432/221 |

(Continued)

FOREIGN PATENT DOCUMENTS

| AU | 2022209317 A1 | 2/2023 | |
| BR | PI1001391 A2 * | 5/2011 | ............ A01M 21/04 |

(Continued)

*Primary Examiner* — Morgan T Jordan

(74) *Attorney, Agent, or Firm* — Oblon, McClelland, Maier & Neustadt, L.L.P.

(57) ABSTRACT

A frost prevention device for protecting crops in open fields from frost damage. The device may include a housing that encloses both solid and liquid fuel storage compartments, a combustion chamber, a solid and liquid fuel feeding system, and an air intake and exhaust fan. The combustion chamber is configured to burn organic solid fuels or combustible liquids, generating heat to raise the ambient temperature around crops. The device may further include a control unit with thermal and moisture sensors configured to automate its operation based on environmental conditions, and a Global Positioning System module configured to assist in navigating through a field.

15 Claims, 8 Drawing Sheets

(56)           References Cited

U.S. PATENT DOCUMENTS

| | | | | |
|---|---|---|---|---|
| 3,205,176 A * | 9/1965 | Tenney | A01G 13/065 | |
| | | | 239/128 | |
| 4,513,529 A * | 4/1985 | Reich | A01G 13/06 | |
| | | | 47/2 | |
| 5,305,548 A * | 4/1994 | Siebol | A01G 13/065 | |
| | | | 47/2 | |
| 6,257,498 B1 * | 7/2001 | Siebol | A01M 7/0014 | |
| | | | 47/2 | |
| 7,263,990 B1 * | 9/2007 | Lenhart | F24C 1/04 | |
| | | | 126/276 | |
| 10,165,888 B2 * | 1/2019 | Steputis | A47J 36/00 | |
| 10,856,694 B1 * | 12/2020 | Baggot | F24C 1/02 | |
| 11,805,942 B1 * | 11/2023 | Slaton | F24C 5/20 | |
| 2004/0088913 A1 * | 5/2004 | Namor | A01G 13/06 | |
| | | | 47/2 | |
| 2010/0014975 A1 * | 1/2010 | Hill | A01G 13/06 | |
| | | | 416/95 | |
| 2011/0103778 A1 * | 5/2011 | Batts | F42B 12/48 | |
| | | | 239/152 | |
| 2017/0079460 A1 * | 3/2017 | Steputis | A47J 37/0763 | |
| 2017/0114996 A1 * | 4/2017 | Moneyhun | F24C 1/04 | |
| 2020/0383312 A1 * | 12/2020 | Polleunis | A01G 13/06 | |
| 2021/0095852 A1 * | 4/2021 | Jones | F24C 1/16 | |
| 2021/0112732 A1 * | 4/2021 | Fischer | A01G 13/06 | |
| 2022/0022385 A1 * | 1/2022 | Namor | A01G 13/06 | |

FOREIGN PATENT DOCUMENTS

| | | | | |
|---|---|---|---|---|
| CN | 109392563 A * | 3/2019 | A01G 13/065 | |
| CN | 112293122 A * | 2/2021 | A01G 13/06 | |
| CN | 112470806 A * | 3/2021 | A01G 13/065 | |
| CN | 114847065 A * | 8/2022 | A01G 13/06 | |
| CN | 114868585 A * | 8/2022 | G05D 27/02 | |
| CN | 116686613 A * | 9/2023 | A01G 13/065 | |
| EP | 0255232 A1 * | 2/1988 | B05B 17/00 | |
| EP | 2898767 A1 * | 7/2015 | A01G 13/06 | |
| EP | 4 212 010 A1 | 7/2023 | | |
| JP | 8-242707 | 9/1996 | | |
| KR | 20130000490 U * | 1/2013 | F24C 1/04 | |
| KR | 20170048058 A * | 5/2017 | A01G 13/065 | |
| KR | 20220029379 A * | 3/2022 | B05B 1/14 | |
| WO | WO-2015035468 A1 * | 3/2015 | A01G 9/243 | |
| WO | WO-2016199357 A1 * | 12/2016 | A01G 9/24 | |
| WO | WO-2022269169 A1 * | 12/2022 | F23B 10/00 | |

* cited by examiner

521

522

52

61

61

DEVICE FOR FROST PREVENTION OF CROPS

TECHNICAL FIELD

The present disclosure generally relates to crop management devices in general, and more particularly to a device for preventing frost of crops in open fields.

BACKGROUND INFORMATION

In winter, the Jordan Valley serves as Jordan's primary hub for crop production. The agricultural output from the Jordan Valley is exported to Europe, Turkey, and the Gulf region during this season. However, frost poses a significant threat to agricultural crops, particularly vegetables, trees, and fruits, leading to substantial economic losses for farmers. This results in a sharp rise in local crop prices, notably vegetables, and diminishes crop exports.

Various attempts have been conducted in the art to develop crops protection devices based on thermal systems.

For instance, the United States patent application publication number US20150289455 discloses a system that irrigates and thermally protects crops fields, wherein the system may be activated in discrete bursts to irrigate crops or activated over a prolonged duration to heat the crops during a freeze or frost event. In one of the embodiments, the system includes a heating system represented by a combustion boiler designed to burn organic waste materials generated by crops, wherein the heating system may include an outer chamber and an inner combustion chamber designed to receive organic field debris.

The Japanese patent publication number JPH08242707 discloses a device capable of preventing frost damage to crops with a small heat loss, by supporting a blower in a warm air layer and sending hot air of a burner from underside of the blower to the ground.

The EP patent application publication number EP 4212010 discloses an anti-frost device with at least one burner designed to generate heated gas; at least one pipe arranged along a row of plants, the pipe is in fluid communication with the burner and has holes for outflow of the heated gas from the pipe. The pipe includes a longitudinal dividing wall so that the pipe includes a first conduit and a second conduit, the holes are formed at the second conduit, the second conduit is closed by means of a bulkhead at a first end of the pipe proximal to the burner and communicates with the first conduit at a second end of the pipe distal to the burner.

The Australian patent application publication number AU2022209317 discloses a frost fan assembly having a tower, a propeller at or near the top of the tower, a burner near the propeller, a blower configured to blow air towards the burner such that a pressurized air flow is provided to the burner. The burner is configured to heat the pressurized air flow before it is blown by the propeller. There is also provided a method of operating a frost fan assembly, the method including providing a frost fan, blowing a pressurized air flow through the conduit such that the pressurized air flow is provided to the burner, using the pressurized air flow to support combustion such that a heated air flow is provided by the burner, directing the heated air flow towards the propeller, and directing the heated air flow to the crops by the propeller.

The US patent number U.S. Pat. No. 4,513,529 discloses a vehicle-mounted machine for preventing frost damage to growing crops includes an upright shell that defines a plenum chamber, having an upwardly opening air inlet in its top and having plural rearwardly extending tubular heating chambers opening from its bottom portion. A fan coaxially mounted in the front of each heating chamber draws air from the plenum chamber and propels it across a propane burner that is coaxially mounted in the heating chamber behind the fan. Discharged air, mixed with combustion gases from the burner, has a temperature of about 45 degrees Fahrenheit, and is emitted rearwardly downwardly and obliquely to both sides of the machine to mix with cold surface air. A field or grove protected by the machine is divided into a grid of equal-area zones, each having a high pole with a light source that is turned on when a sensor near ground level detects a temperature above but near freezing.

SUMMARY

Thus, it is an object of the present disclosure to provide a frost prevention device that may combat frostbite on crops, enhances crop management practices, and aids in pest control measures.

In aspects of the present disclosure, the frost prevention device may include a housing that encloses a support frame that may be configured to support the housing, a liquid storage compartment, a combustion chamber, a solid fuel feeding unit, a liquid fuel feeding unit, and an air intake fan. The frost prevention device may further include a solid fuel storage compartment, an exhaust fan, and a control unit.

In aspects of the present disclosure, the air intake fan may be configured to supply the combustion chamber with the necessary air via an in operable connection with a conduit. The device may expel hot air generated in the combustion chamber by utilizing the exhaust fan.

In aspects of the present disclosure, the solid fuel feeding unit may have a second housing, an actuator, and a screw, wherein the actuator may be operably connected to the second housing via a lateral opening. The solid fuel storage compartment may be configured to connect the second housing via an upper opening. The combustion chamber may be connected to the solid fuel feeding unit through a lower opening.

In aspects of the present disclosure, the combustion chamber may have a main body and a combustion drawer, wherein the main body may include an upper end and a lower end. The drawer may be positioned at the proximity of the lower end.

In aspects of the present disclosure, the air intake fan may be configured to be operably connected to the combustion chamber through a conduit to supply the necessary air for complete combustion of the solid and/or liquid fuel.

In further aspects of the present disclosure, the exhaust fan may be operably connected to the upper end of the combustion chamber and configured to expel hot air and flue gases generated during combustion.

The control unit may include a controller and sensors, wherein the control unit may be configured to regulate the combustion process. Sensors may monitor external environmental conditions and adjust the device's operation accordingly.

In aspects of the present disclosure, the frost prevention device may include a GPS module for positioning and navigating in the field, allowing for targeted heat application where frost conditions are severe.

BRIEF DESCRIPTION OF DRA WINGS

The present disclosure will now be described with reference to the accompanying drawings, without however limiting the scope thereto, and in which.

DETAILED DESCRIPTION

Figure 1:
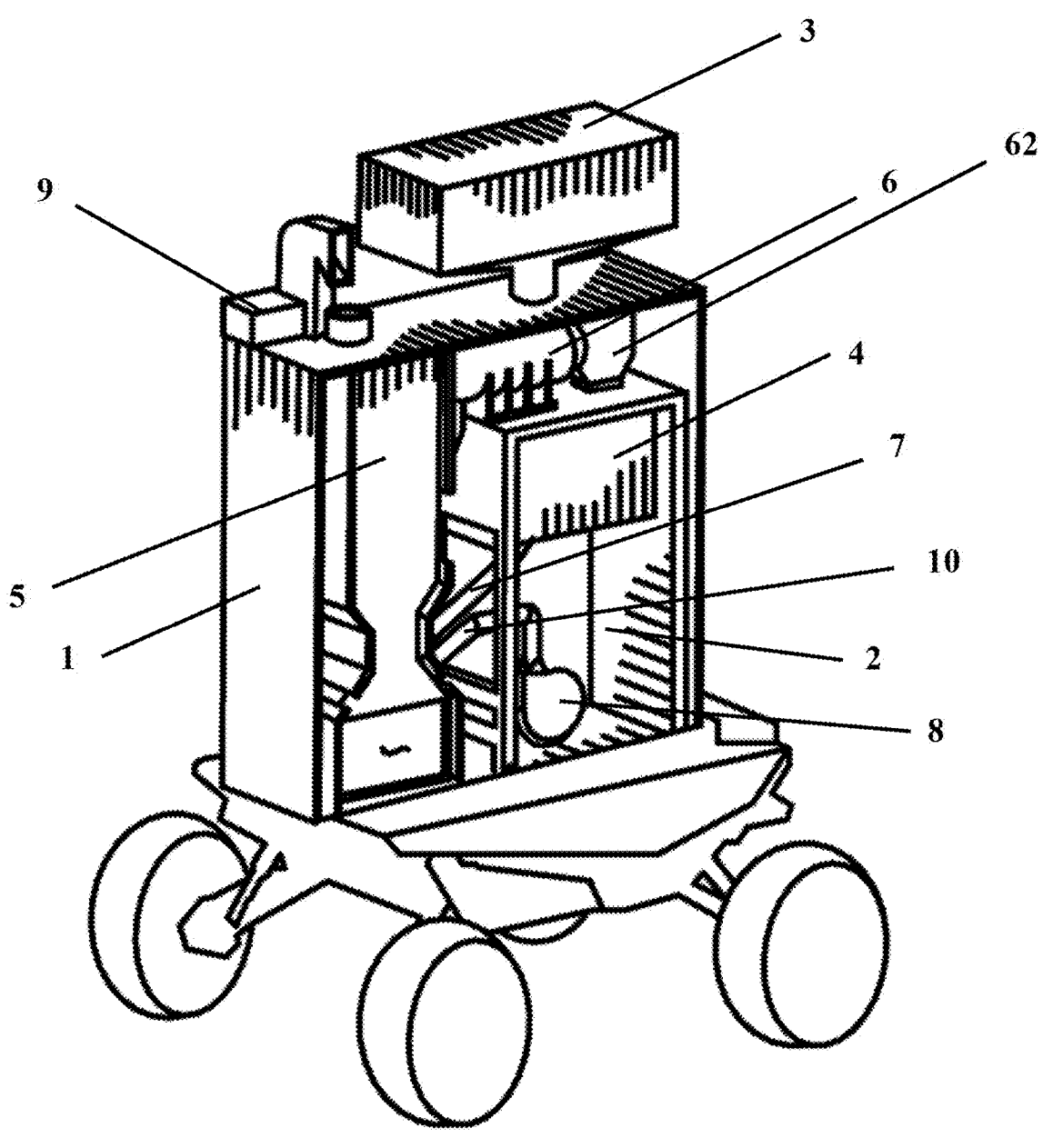
FIG. 1 illustrates a partial sectional schematic view of a frost prevention device configured in accordance with embodiments of the present disclosure, showing internal configuration of the device.
Figure 2A:
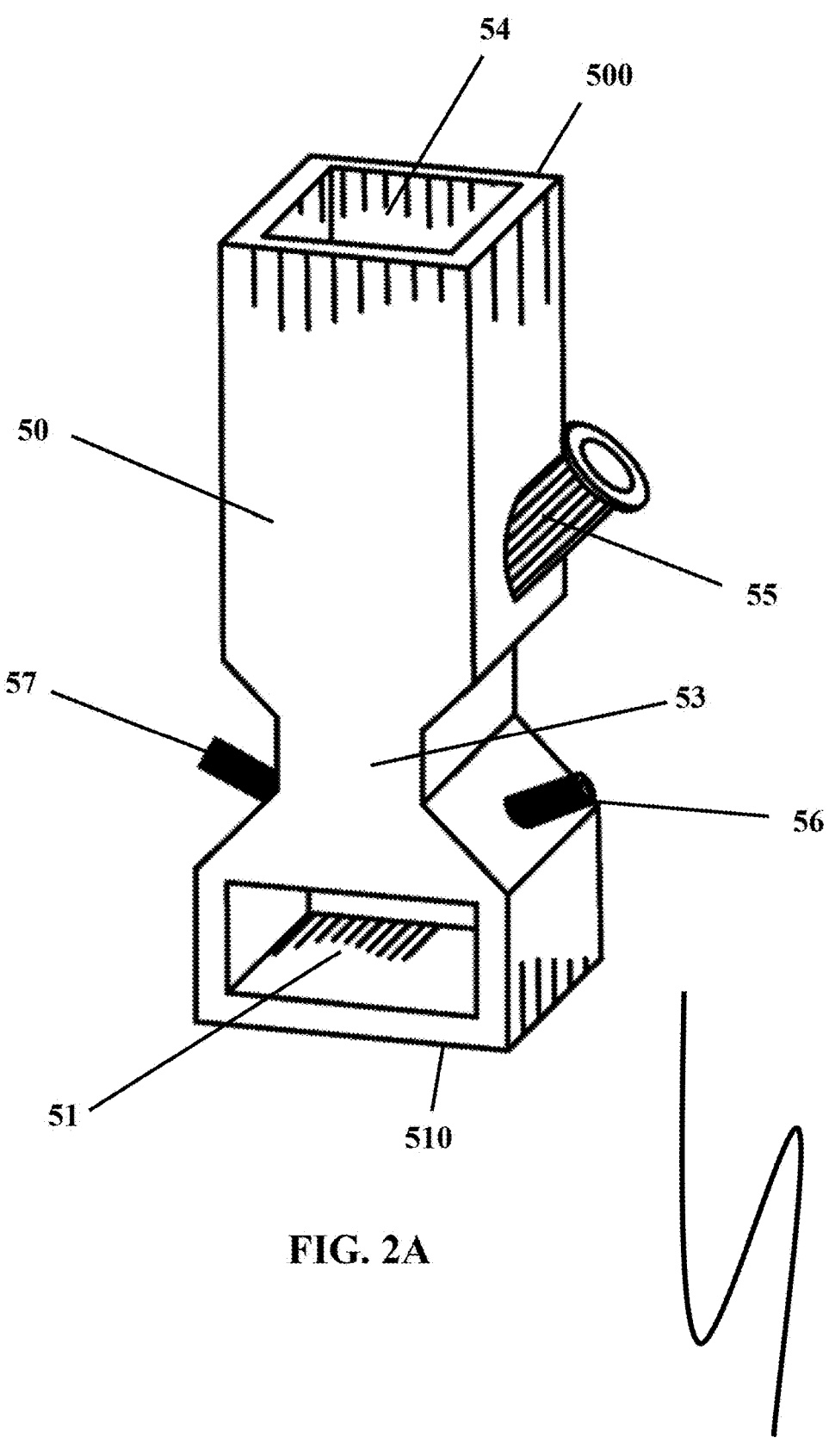
FIG. 2A illustrates a perspective view of a combustion chamber's main body of a frost prevention device configured in accordance with embodiments of the present disclosure.
Figure 2B:
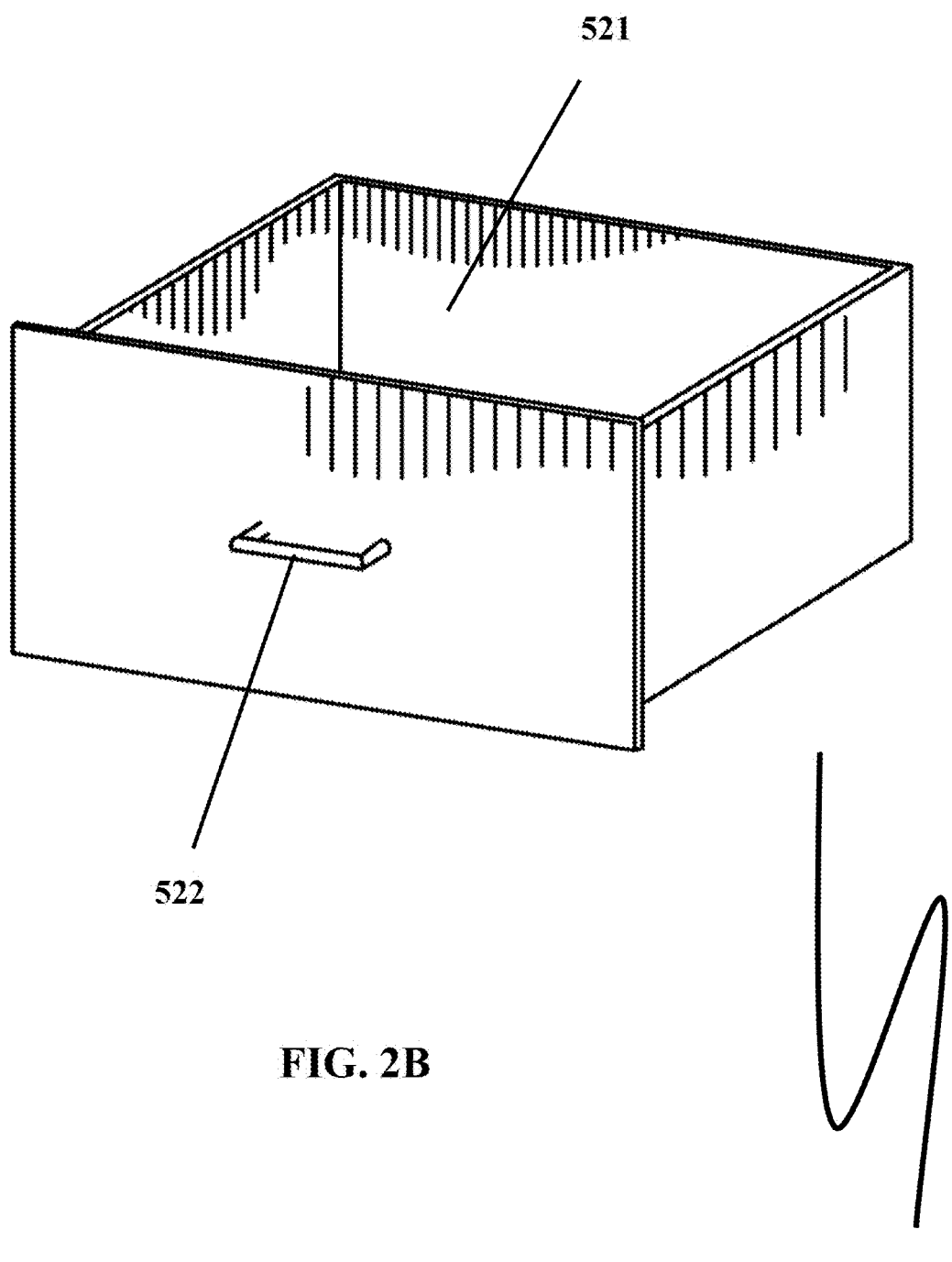
FIG. 2B illustrates a schematic perspective view of a combustion chamber's drawer of a frost prevention device configured in accordance with embodiments of the present disclosure.
Figure 3:
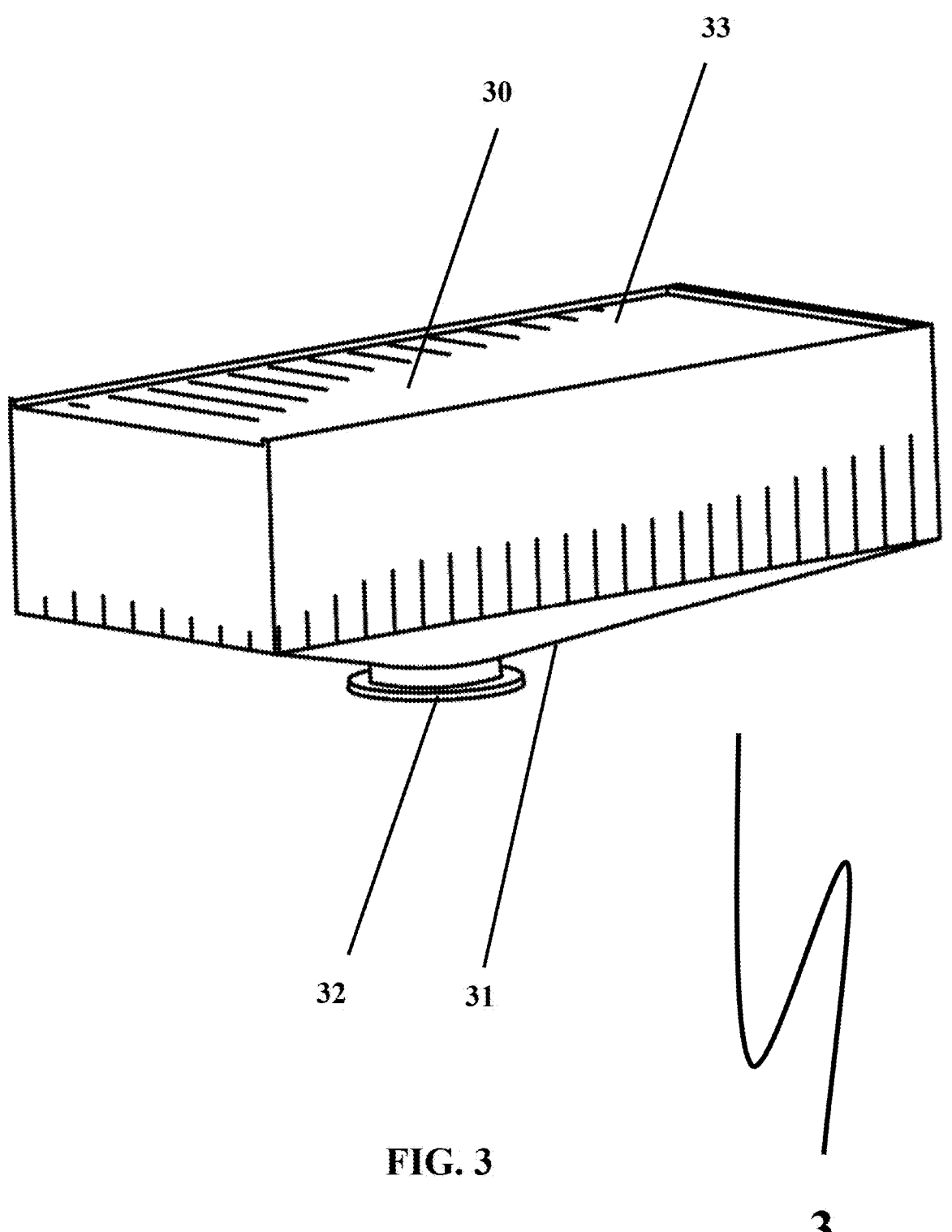
FIG. 3 illustrates a schematic perspective view of a veneer upper storage tank of a frost prevention device configured in accordance with embodiments of the present disclosure.
Figure 4A:
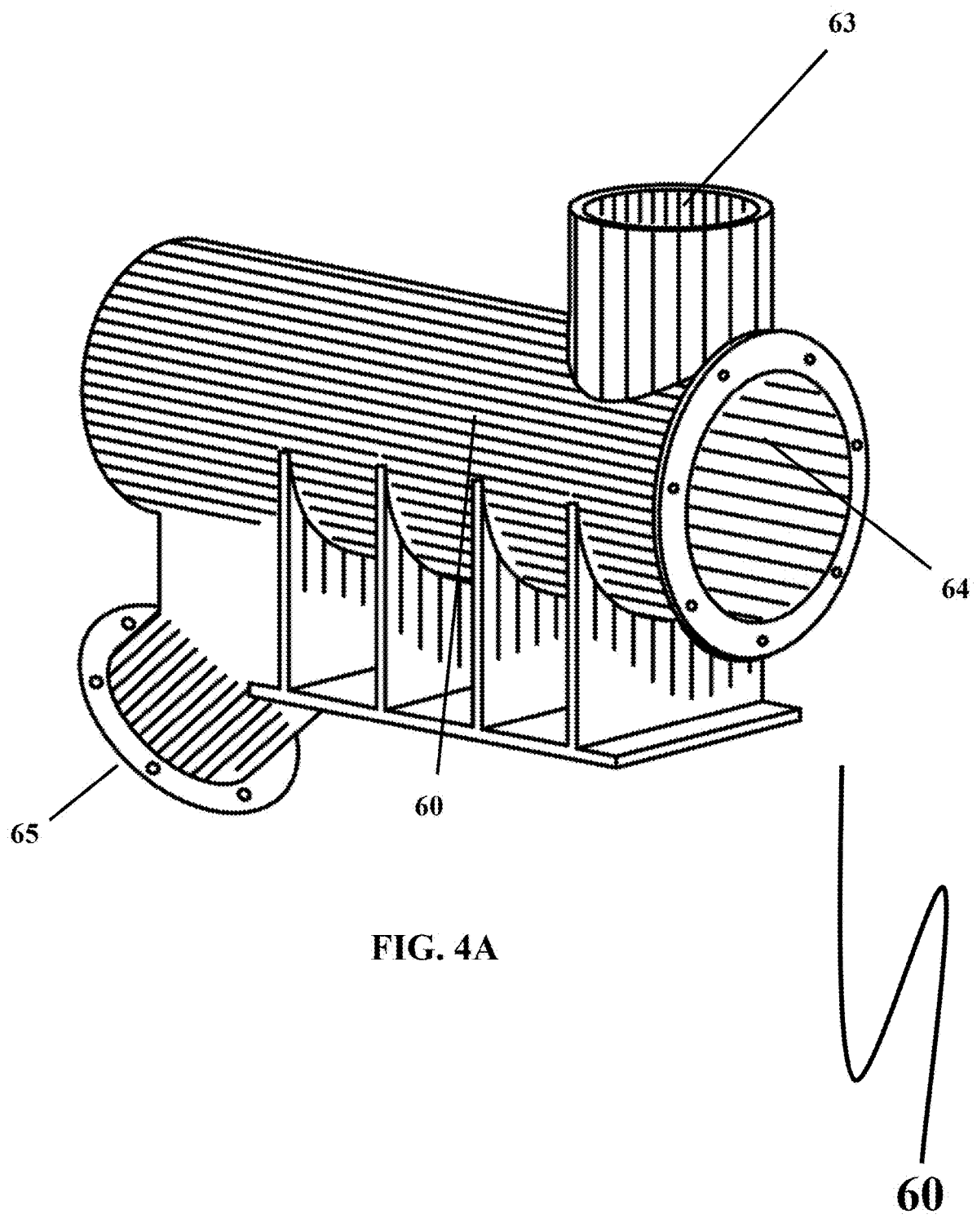
FIG. 4A illustrates a schematic perspective view of a screw-feeding housing of a frost prevention device configured in accordance with embodiments of the present disclosure.
Figure 4B:
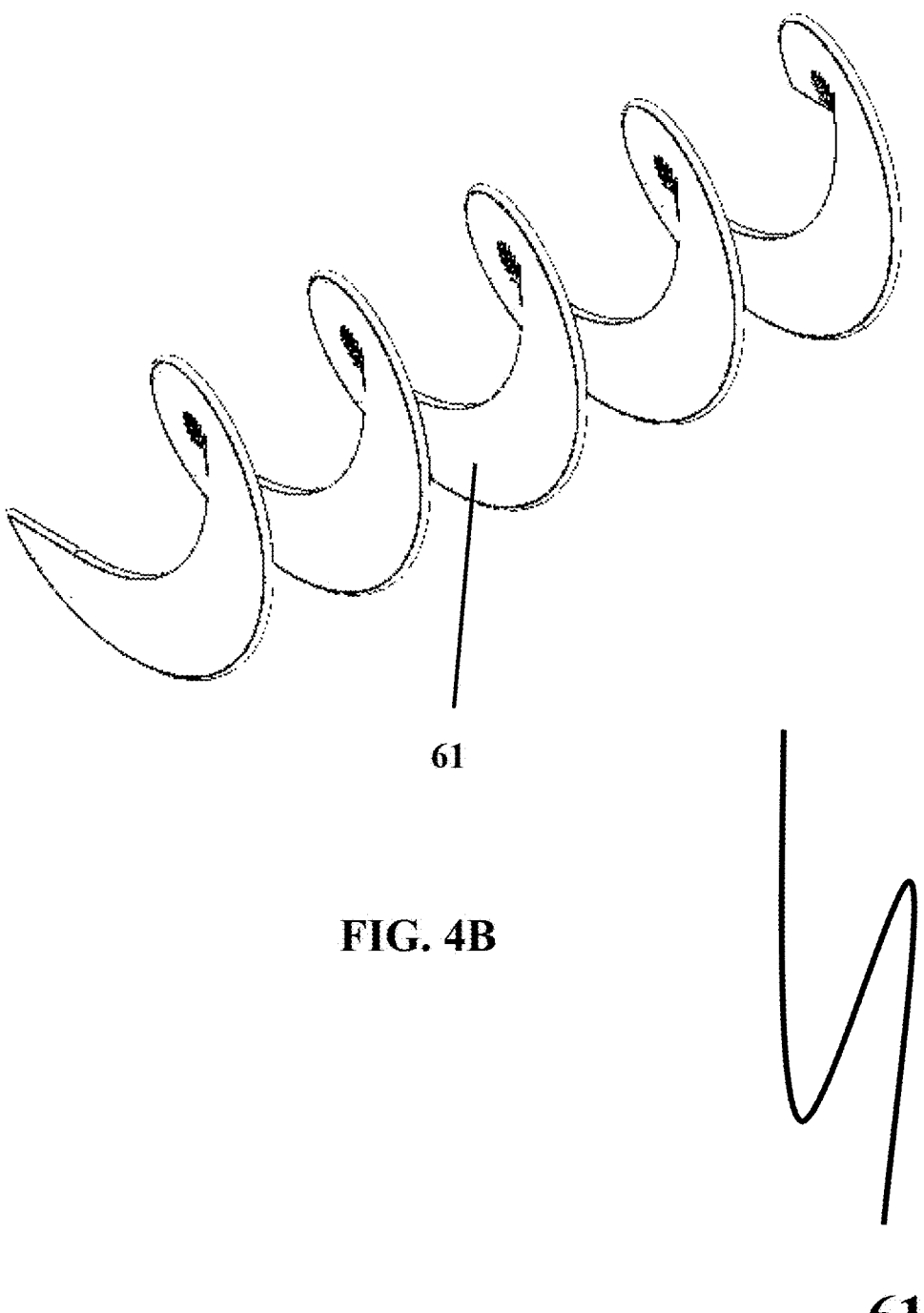
FIG. 4B illustrates a schematic perspective view of a feeding screw of a frost prevention device configured in accordance with embodiments of the present disclosure.
Figure 5:
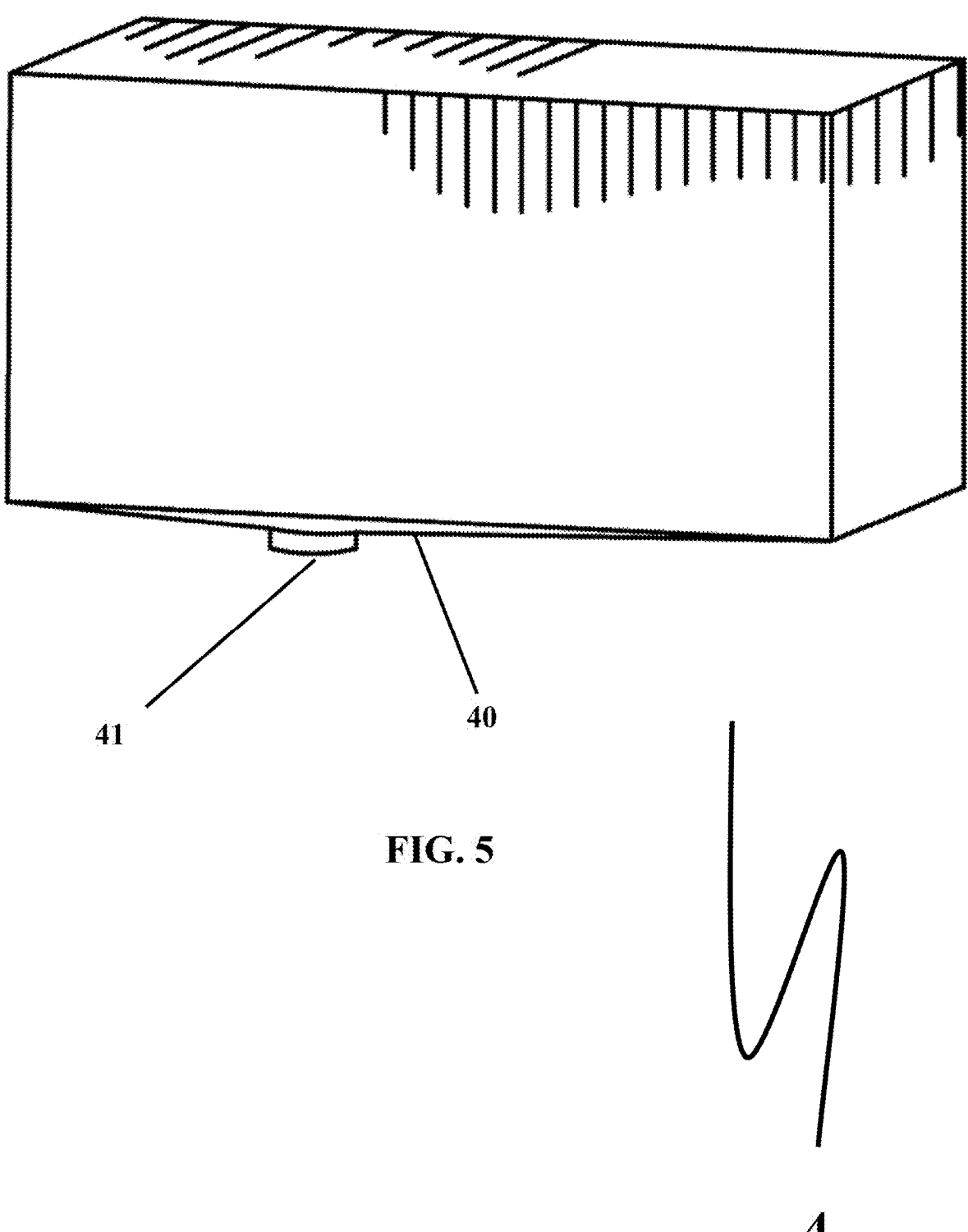
FIG. 5 illustrates a schematic perspective view of an oil storage tank of a frost prevention device configured in accordance with embodiments of the present disclosure.
Figure 6:
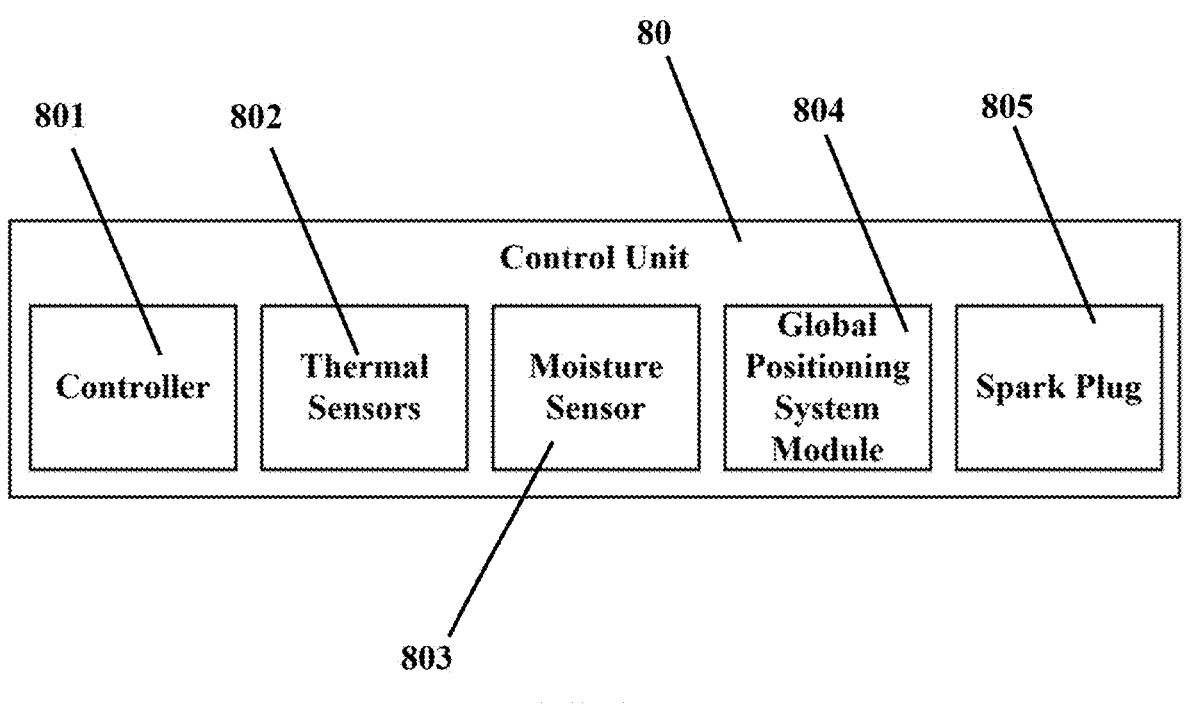
FIG. 6 illustrates a block diagram of a control unit of a frost prevention device configured in accordance with embodiments of the present disclosure.

FIGS. 1-6 illustrate a frost prevention device for crops, configured in accordance with embodiments of the present disclosure.

In embodiments of the present disclosure, the frost prevention device may include a housing 1, a support frame 2, a solid fuel storage compartment 3, a liquid fuel storage compartment 4, a combustion chamber 5, a solid fuel feeding unit 6, a liquid fuel feeding unit 7, an air intake fan 8 operably connected to the combustion chamber 5, and an exhaust fan 9 operably connected to the combustion chamber 5.

In embodiments of the present disclosure, the housing 1 may be configured to enclose the liquid fuel storage compartment 4, the combustion chamber 5, the solid fuel feeding unit 6, the liquid fuel feeding unit 7, the air intake fan 8, and the exhaust fan 9.

In embodiments of the present disclosure, the frost prevention device may be an autonomous ground vehicle.

In embodiments of the present disclosure, the upper solid fuel storage compartment 3 may be configured to enclose olive veneer mill pomace or any other organic combustible materials used for combustion. The solid fuel storage compartment 3 may have a space gap 30 defining an enclosing space for the solid fuel, a conical lower end bottom 31 with an outlet 32, the outlet 32 is in operable connection with the solid fuel feeding unit 6 and may be configured to facilitate a smooth flow of enclosed materials into the solid fuel feeding unit 6. The upper solid fuel storage compartment 3 may have a lid 33 for easy refilling and contamination prevention.

In embodiments of the present disclosure, the liquid fuel storage compartment 4 is configured to store oil or other liquid organic combustible materials. The liquid fuel storage compartment 4 has a conical bottom end 40 with an outlet 41 configured to be in operable connection with the liquid fuel feeding unit 7 and to facilitate a smooth flow of liquid fuel into the combustion chamber 5 through the liquid fuel feeding unit 7.

In embodiments of the present disclosure, the combustion chamber 5 may include a main body 50 with an upper end 500 and a lower end 510 and a combustion drawer slot 51 in proximity to the lower end 510, wherein the combustion drawer slot is configured to receive a combustion drawer 52, this configuration would allow for an easy removal of the combustion drawer for cleaning and maintenance. The main body 50 of the combustion chamber extends throughout the housing 1 with a constriction 53. The main body 50 has a pass-through opening 54 configured to pass hot gasses from the combustion chamber 5 to an exhaust fan 9.

The combustion chamber 5 may further include an ignition system (not shown) to initiate combustion within the combustion drawer 52. The ignition system is configured to operate automatically in response to temperature sensors detecting frost conditions.

The main body 50 may further include a solid fuel inlet 55 a liquid fuel inlet 56, an air inlet 57. The solid fuel inlet 55 may be in operable connection with the solid fuel feeding unit 6. The liquid fuel inlet 56 may be in operable connection with the liquid fuel feeding unit 7.

The solid fuel feeding unit 6 may include a second housing 60, a screw 61 enclosed therein, and an actuator 62 configured to trigger an operation of the screw 61 to mobilize the solid fuel enclosed within the solid fuel storage compartment 3 to the combustion chamber 5 through the solid fuel inlet 55.

The second housing 60 may further include an upper opening 63, a lateral opening 64, and a lower opening 65. The upper opening 64 may be configured to connect the solid fuel storage compartment 3 to the solid fuel feeding unit 6 in order to supply the unit 6 with solid fuel to be then mobilized to the combustion chamber 5 through the lower opening 65, which may be in operable connection with the solid fuel inlet 55 of the combustion chamber 5. The lateral opening 64 along with the second housing 60 are configured to receive the screw 61, wherein the screw is connected to a shaft (not shown) of the actuator 62 and controls the feeding rate of the solid fuel. The lateral opening 64 also provides a fixation means to the actuator 61.

In embodiments of the present disclosure, the outlet 41 of the liquid fuel storage compartment 4 is connected to the liquid fuel inlet 56 of the combustion chamber 5 through the liquid fuel feeding unit 7.

In embodiments of the present disclosure, the air intake fan 8 may be configured to be operably connected to the air inlet 57 of the combustion chamber 5 through one or more pipes 10, and may be configured to supply the combustion chamber 5 with the required air for having a complete combustion of the solid fuel and/or the liquid fuel.

In embodiments of the present disclosure, the exhaust fan 9 may be configured to be connected in proximity to the upper end 500 of the combustion chamber 5, and may be configured to blow out hot air and flue gases through the pass-through opening 54 of the combustion chamber to the ambient environment, thereby raising the temperature of the ambient environment thus reducing the possibility of plant frost.

In embodiments of the present disclosure, the device may further include a control unit 80 that would include a controller 801 and a plurality of sensors configured to monitor both ambient conditions and the operation of the device of the present disclosure. The plurality of sensors may include thermal sensors 802 placed on the housing 1 and inside the combustion chamber 5 to measure external and internal temperatures, respectively. A moisture sensor 803 may be also provided.

In embodiments of the present disclosure, the control unit 80 may also have one or more spark plugs 805 connected to an electrical energy source, and an interface that integrates the plurality of sensors with the device, allowing for automated operation based on temperature and humidity inputs. The controller 801 may be configured to facilitate movement, ignition, and shutdown of the device.

In embodiments of the present disclosure, the one or more spark plugs 805 may be configured to start a spark that would initiate combustion of the solid or liquid fuel inside the combustion chamber 5.

In embodiments of the present disclosure, the device of the present disclosure may also include a Global Positioning System ("GPS") module 804 to enable precise movement and tracking within the field. This ensures that the system can navigate effectively and apply heat to areas most affected by frost.

The singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

Unless defined otherwise, all technical and scientific terms used herein have the same meaning as commonly understood to one of ordinary skill in the art to which presently disclosed subject matter belongs. Although any methods, devices, and materials similar or equivalent to those described herein can be used in the practice or testing of the presently disclosed subject matter, representative methods, devices, and materials are now described.

While embodiments of the present disclosure have been described in detail and with reference to specific embodiments thereof, it will be apparent to one skilled in the art that various additions, omissions, and modifications can be made without departing from the spirit and scope thereof.

The invention claimed is:

1. A frost prevention device for crops in a field, comprising:
   a housing supported on a chassis comprising wheels;
   a support frame configured to hold the housing;
   a solid fuel storage compartment configured to enclose solid fuel;
   a liquid fuel storage compartment;
   a combustion chamber configured to burn solid and/or liquid fuel;
   a solid fuel feeding unit in operable connection with the solid fuel storage compartment and the combustion chamber;
   a liquid fuel feeding unit in operable connection with the liquid fuel storage compartment and the combustion chamber;
   an air intake fan configured to provide the combustion chamber with air required for complete combustion of solid and/or liquid fuel;
   an exhaust fan; and
   a control unit configured to operate the frost prevention device autonomously, wherein the combustion chamber comprises:
   a main body with an upper end and a lower end;
   a combustion drawer;
   a combustion drawer slot in proximity to the lower end configured to removably receive the combustion drawer;
   a constriction in the main body;
   a solid fuel inlet in operable connection with the solid fuel feeding unit;
   a liquid fuel inlet in operable connection with the liquid fuel feeding unit;
   an air inlet in operable connection with the air intake fan; and
   a pass-through opening in operable connection with the exhaust fan and configured to move flue gases and hot air to a surrounding environment outside the housing.

2. The device of claim 1, wherein the housing is configured to enclose the liquid fuel storage compartment, the liquid fuel feeding unit, the solid fuel feeding unit, the combustion chamber, and the air intake fan.

3. The device of claim 1, wherein the constriction in the main body is on at least two sides of the main body.

4. The device of claim 1, wherein the solid fuel feeding unit comprises:
   a second housing with an upper opening connected to the solid fuel storage compartment, a lateral opening, and a lower opening connected to the combustion chamber; and
   a screw within the housing connected to an actuator to control the feed rate of the solid fuel to the combustion chamber.

5. The device of claim 1, wherein the control unit comprises:
   a controller configured to process input and output data;
   a spark plug configured to initiate combustion of the solid and/or liquid fuel inside the combustion chamber;
   thermal sensors positioned both outside the housing and inside the combustion chamber;
   a moisture sensor on the exterior of the housing; and
   a Global Positioning System module for precise movement and tracking within the field.

6. The device of claim 1, wherein the main body has a pass-through opening at an uppermost portion of the main body.

7. The device of claim 6, wherein the exhaust fan is configured to blow out hot air and flue gases through the pass-through opening of the combustion chamber to an ambient environment in the field.

8. The device of claim 1, wherein the main body has a pass-through opening configured to pass hot gasses from the combustion chamber to the exhaust fan.

9. The device of claim 8, wherein the exhaust fan is configured to blow out hot air and flue gases through the pass-through opening of the combustion chamber to an ambient environment in the field.

10. The device of claim 1, wherein upper solid fuel storage compartment is configured to enclose olive veneer mill pomace used for combustion in the device.

11. The device of claim 1, wherein the liquid fuel storage compartment has a conical bottom end.

12. The device of claim 1, wherein the liquid fuel storage compartment has a conical bottom end with an outlet configured to be in operable connection with the liquid fuel feeding unit.

13. The device of claim 1, wherein the liquid fuel storage compartment has a conical bottom end with an outlet configured to be in operable connection with the liquid fuel feeding unit and to facilitate flow of liquid fuel into the combustion chamber through the liquid fuel feeding unit.

14. The device of claim 1, further comprising:
a moisture sensor.

15. The device of claim 1, further comprising:
liquid fuel and solid fuel.

\* \* \* \* \*